Dec. 22, 1942.   E. FREYSSINET   2,306,160
PACKING DEVICE
Filed July 5, 1939   2 Sheets-Sheet 2

Eugene Freyssinet
By Watson, Cole, Grindle & Watson
Attys.

Patented Dec. 22, 1942

2,306,160

UNITED STATES PATENT OFFICE 2,306,160

PACKING DEVICE

Eugène Freyssinet, Neuilly-sur-Seine, France; vested in the Alien Property Custodian Application July 5, 1939, Serial No. 282,958
In France July 29, 1938

8 Claims. (Cl. 288—6)

The present invention relates to fluidtight packing devices for conduits, pipes and other articles, of the kind including a hollow ring which is interposed between the surfaces to be connected and into the inside of which a fluid under pressure is injected.

The object of the present invention is to provide a device of this kind which is better adapted to meet the requirements of practice than those used for the same purpose up to the present time.

According to an essential feature of the present invention, in order to form a packing device of this kind capable of ensuring the maximum of safety, I combine the following elements: a hollow ring of malleable and resistant material such as metal, and a lining of plastic material ensuring fluidtight contact between the ring in question and the surfaces to be connected together. Furthermore, advantageously, according to the present invention, I provide means for maintaining the plastic material on the ring, for instance a device constituted by rings of U-shaped section which pinch this material on the edges of the ring.

For placing the ring under pressure, it is advisable to make use of a matter which is fluid at the time of the filling, but which comes into the solid state shortly thereafter, whereby any leakage now becomes impossible and the ring keeps the plastic material compressed, in a permanent manner, between itself and the walls to connect together.

Other features of the present invention will result from the following detailed description of some specific embodiments thereof.

Preferred embodiments of the present invention will be hereinafter described, with reference to the accompanying drawings, given merely by way of example, and in which.

Figure 1:
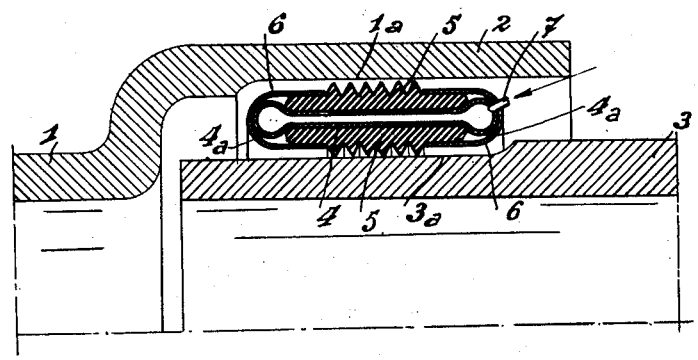
Fig. 1 is a view of an embodiment of the packing device according to the invention, shown in section through a plane passing through the axis of the two pipes to be coupled together. In this drawing, the packing device is shown as it is being placed between two pipes and prior to the inflating of the ring member.

In the drawings, reference character 1 designates a wall of the pipe provided with a coupling flange 2; reference character 3 designates a second pipe the end of which is to be engaged in the first one. Between these two pipes is interposed the packing device according to the present invention.

This packing device includes the following elements:

a. A hollow ring 4 of metal the section of which includes, in the example illustrated by the drawings, two parallel rectilinear portions joined at their ends with two circular portions 4a;

b. Two rubber lining elements 5, constituted by bands or strips located on either side of said ring between the rounded portions thereof, said strips being preferably provided, on their external faces, with projections or ridges intended to improve the contact between the surfaces of the rubber elements and the corresponding surfaces of the pipes (these strips may be reinforced by means of wires or cloth sections so as to increase their strength);

c. Two annular pinching elements 6, of metal, which bear against the edges of ring 4 and keep the rubber elements in position.

A nozzle 7 opening, at a suitable point, into the inside of metallic ring 4 permits of injecting a fluid under pressure thereinto.

Before being used, the packing device has, in section, the shape shown by Fig. 1, the intermediate rectilinear portions of ring 4 being nearly in contact with each other, so that this ring can be inserted between the two pipes.

When fluid under pressure is injected through nozzle 7, the metal ring is inflated. Its two rectilinear portions are moved away from each other, while however remaining parallel, owing to the terete surfaces 4a. When inflating, the metal ring tightly applies the rubber lining elements 5 against the walls of the pipes and fluidtightness is thus ensured in a perfect manner. Finally, by friction on the walls of the pipes, rings 6, compressed between the pipe elements, prevent expansion of rubber elements 5 parallel to the axis of the pipes, owing to the pressure of the fluid contained in the pipes. The fitting in position and the correct maintaining of the packing device can be facilitated by slightly hollowing out the walls of the pipes, as shown at 1a and 3a on the drawings.

Ring 4 and clips 6 may be made of any malleable metal which will be chosen according to the nature of the fluid present in the pipes. Among the metals which can be used for this purpose, I may cite copper and copper alloys, aluminium and aluminium alloys, especially the alloys that can easily be welded, rustproof steel, and so on.

When the metal that is employed is capable of attacking rubber through its impurities or its salts, it will be advantageous to provide between lining elements 5 and ring 4, on the one hand, and between the lining elements and rings 6, on the other hand, intermediate protective sheets, such for instance as paper or aluminium sheets.

If the filling or ring 4 is effected by means of a matter which is first injected in the liquid state but grows solid and remains in this state under normal conditions of use, the pressure exerted by rubber lining elements 5 remains constant and it cannot be destroyed by eventual deteriorations of ring 4. I finally obtain a packing device which is very strong and highly reliable, while being deformable.

As suitable materials for this purpose, I may cite synthetic resins, which pass from the liquid state to the solid state either automatically or in response to conditions easy to comply with at the place where the device is used, for instance a slight variation of temperature. Among these resins, I may cite that known, at the present time, under the name of "brauthite," which is a resin consisting chiefly of formaldehyde and phenol and which hardens in the presence of air.

I might also make use of materials which are solid at ordinary temperature and have a melting point which is relatively low and introduce such materials into ring 4 in the molten state. In this case, it would be advantageous to heat ring 4 in advance, for instance by means of an electric current.

Finally, it would be possible to make use of cements which would be injected into ring 4, in the form of a sufficiently fluid body.

Figure 3:
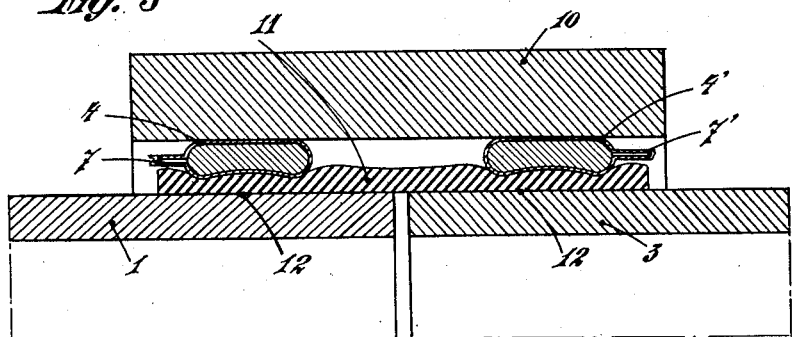
Fig. 3 shows another embodiment of the packing device shown in section by a plane passing through the common axis of the two pipes that are to be coupled together.

In the embodiment illustrated by Fig 3, the packing device is applied to an assembly of pipes by means of an outer ring. Reference characters 1 and 3 designate the ends of the pipes to be coupled together. 10 is the outer annular element which can be made of the same material as the pipes or of any other material, either fluidtight or not (sheet metal, cast iron, reinforced concrete, and so on); 4 and 4' are hollow rings of malleable metal, such as those above described.

By means of nozzles 7 and 7', it is possible to inject under pressure, in the liquid state, into each of these rings respectively, materials which are adapted to solidify in the manner above set forth.

In order to ensure fluidtightness, I combine with the malleable rings thus inflated under pressure, a lining element of a plastic such as rubber, constituted by a ring 11 which surrounds the adjoining ends of the two pipes to be coupled together, according to the invention.

Owing to the pressure exerted by the inflated rings on the plastic ring 11, fluidtightness is ensured at the points 12, so that it will be readily understood that the outer ring 10 needs not be fluidtight.

Figure 2:
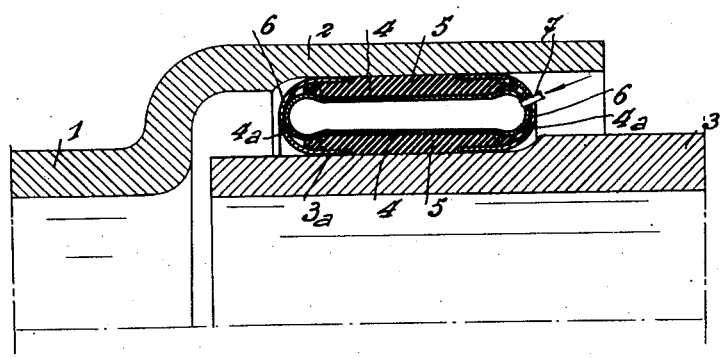
Fig. 2 is a similar view showing the same packing device after the ring member has been inflated.
Figure 4:
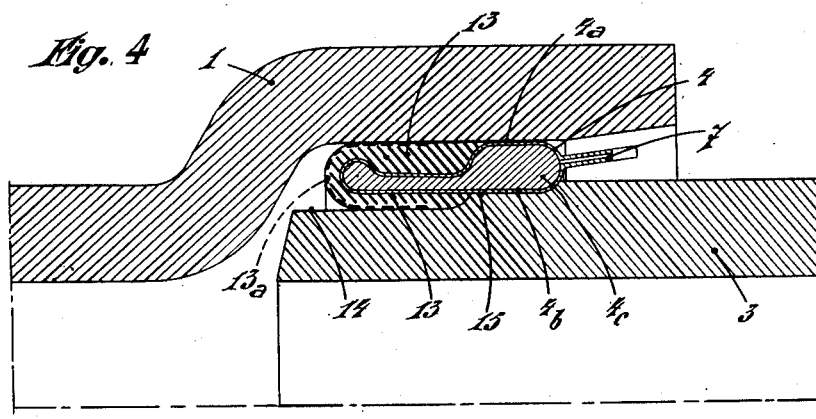
Fig. 4 is a view, analogous to Fig. 3, showing still another embodiment of the invention.
Figure 5:
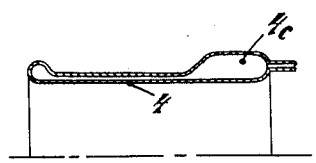
Fig. 5 shows, in section, the initial shape of the ring of malleable metal which serves to constitute the packing device illustrated by Fig. 4 of the drawings.

In the embodiment of Figs. 4 and 5, I have shown a coupling of the same type as that illustrated by Figs. 1 and 2. The malleable ring 4 interposed between the male and female ends of the pipes to be coupled together, to wit 1 and 3 is lined, toward the inside of the pipes, with a ring 13 of a plastic such as rubber which has, in section, the general shape of a letter C. When the ring is inflated by the solidifiable filling material, this element 13 is tightly held between the respective ends of the pipes and thus ensures fluidtightness of the joint. Near the end of the packing device, the hollow metal ring bears directly at 4a and 4b against the walls of the pipes. This arrangement is interesting because it permits of obtaining, at this place, a solid bearing of invariable thickness between the pipes. This joint, ensured by the ring and its filling of solidified matter, prevents any transverse displacement of the two pipes with respect to each other, only longitudinal movements remaining possible under the action of efforts sufficiently high for overcoming the frictions existing between ring 4 and the wall of the pipes.

Figure 6:
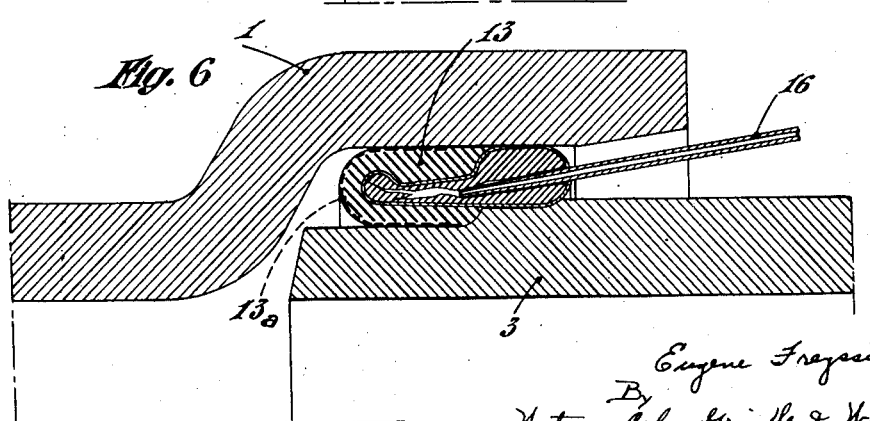
Fig. 6 is a sectional view of a device for re-inflating the hollow ring so as to compensate for leakage of the fluid contained in the pipes of the system.

This result may be improved by making hollow ring 4 in such manner that it includes a portion 4c of relatively large volume at the place where said ring bears directly against the pipes. A ring such as shown before inflating in Fig. 5, and inflated in Fig. 6 complies with this condition.

On the other hand, it will be seen that, whatever be the pressure in the pipes, the rubber ring 13 which covers one of the edges of ring 4 cannot escape between this ring and the pipes.

Besides, plastic ring 13 might be covered by a metallic clip 13a of C-shaped section analogous to clips 6 of Figs. 1 and 2.

In order to reinforce the packing device, I may provide, in the male end 3, two successive notches 14 and 15, one of which, 14, cooperates with the rubber ring, and the other, 15, with the outer bulging end of the hollow ring.

The pressures developed in said ring when it is inflated can be extremely high, for instance several hundreds of kilograms per square centimeter.

The fluidtight packing device according to the invention therefore does not undergo any limitation as to the pressures it may be called upon to support before leakage of the fluid contained in the pipes.

An important property of this packing device is that it can be easily tightened at any time. Supposing that leakage of the fluid contained in the pipes occurs at any time, after hardening of the material filling the malleable ring or rings, it suffices to drive a hole through the wall of the ring at any time which can be reached from the outside, and to insert into said hole a strong conical and hollow needle 16 (Fig. 6) through the axial channel of which it is possible to inject, into the ring, a liquid under pressure. This operation is perfectly successful with synthetic resins and in particular with the resin called "brauthite," injected under sufficiently high pressures (as high as several hundreds of kilograms per square centimeter) for breaking the hardened matter which surrounds the end of the needle. At this time, the liquid having made a path through the matter previously hardened, evenly swells the ring by forming between the old material and the wall of the ring a new layer which serves to tighten the ring and to make it fluidtight. This possibility of tightening the ring joints is, as it will be readily understood, extremely important because it gives them a practical value equivalent to that of joints adapted to be tightened by means of bolts while their cost is considerably lower and they do not include screw threads capable of being destroyed under the action of rust.

The packing device according to the present invention has many applications. It can even be employed in the case of pipes for conveying petroleum or like liquids because the swelling of rubber under the influence of petroleum increases the compression of the rubber parts. Besides, it is possible to choose, according to the circumstances, other plastic materials than rubber, such for instance as wicks impregnated with bitumen, and so on.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A fluid tight packing device for insertion between two parts which comprises, in combination, a hollow inflatable ring of malleable resistant metal, a mass of material filling said metallic ring which is liquid when injected into the ring but solid under normal conditions of use of said packing device, a lining of plastic surrounding said metallic ring so as to be interposed between the opposite outer walls thereof and said two parts respectively, and metallic clamping means applied to the margins of said device for retaining said lining in place on the ring.

2. A fluid tight packing device for insertion between two parts which comprises, in combination, a hollow inflatable ring of malleable metal, said ring having in transverse section two parallel rectilinear portions and two rounded end portions joining said rectilinear portions together, at least one of said rounded portions having a diameter greater than the distance between said rectilinear portions, material within said hollow metal ring inflating the same, a lining of plastic surrounding said metal ring so as to be interposed between the opposite outer walls thereof and said two parts respectively, said lining being retained in position by means of said rounded marginal portions of greater diameter.

3. A fluid tight packing device for insertion between two parts which comprises, in combination, a hollow inflatable ring of malleable metal, said ring having in transverse section two parallel rectilinear portions and two rounded end portions joining said rectilinear portions together, at least one of said rounded portions having a diameter greater than the distance between said rectilinear portions, material within said hollow metal ring inflating the same, a lining of plastic surrounding said metallic ring so as to be interposed between the opposite outer walls thereof and said two parts respectively, said lining being retained in position by means of said rounded marginal portions of greater diameter, and metallic clamping means applied to the margins of said device to aid in retaining said lining in place on the ring.

4. A fluid tight packing device for insertion between two parts which comprises, in combination, a hollow inflatable ring of malleable metal, said ring having in transverse section two parallel rectilinear portions and two rounded end portions joining said rectilinear portions together, at least one of said rounded portions having a diameter greater than the distance between said rectilinear portions, material within said hollow metal ring inflating the same, a lining of plastic surrounding said metallic ring so as to be interposed between the opposite outer walls thereof and said two parts respectively, said lining being retained in position by means of said rounded marginal portions of greater diameter, and metallic clamps comprising resilient elements of U-shaped cross section applied to the margins of said device to aid in retaining said lining in place on the ring.

5. A fluid tight packing device for insertion between two annular radially separated parts which comprises, in combination, a hollow inflatable ring of malleable metal, said ring having in transverse section two parallel rectilinear portions and two rounded end portions joining said rectilinear portions together, at least one of said rounded portions having a diameter greater than the distance between said rectilinear portions, material within said hollow metal ring inflating the same, a lining of rubber surrounding said metallic ring so as to be interposed between the opposite outer walls thereof and said two parts respectively, said lining being retained in position by means of said rounded marginal portions of greater diameter, and metallic clamps comprising annular resilient elements of U-shaped cross section applied to the margins of said device to aid in retaining said lining in place on the ring.

6. A fluid tight packing device for insertion between two parts which comprises, in combination, a hollow inflatable ring of malleable metal and of non-circular cross-section, opposite walls of said ring being parallel and disposed relatively closely together, edge portions of said ring being thicker than the ring at said firstnamed portions, two annular bands of resilient plastic material disposed around said ring adjacent said firstnamed parallel portions and prevented from moving endwise of said ring by said enlarged edge portions.

7. A fluid tight packing device for insertion between two parts which comprises, in combination, a hollow inflatable ring of malleable metal, said ring having in transverse section two parallel rectilinear portions and two rounded end portions joining said rectilinear portions together, at least one of said rounded portions having a diameter greater than the distance between said rectilinear portions, material within said hollow metal ring inflating the same, a lining of plastic surrounding said metal ring so as to be interposed between the opposite outer walls thereof and said two parts respectively, said lining being retained in position by means of said rounded marginal portions of greater diameter, said rounded portions also being of sufficient thickness to give a direct self-centering contact between said two parts, while the linings are compressed between said rectilinear portions and said parts.

8. A fluid tight packing device for insertion between two parts which comprises, in combination, a hollow inflatable ring of malleable metal, said ring having in transverse section two parallel rectilinear portions and two rounded end portions joining said rectilinear portions together, at least one of said rounded portions having a diameter greater than the distance between said rectilinear portions, material within said hollow metal ring inflating the same, a lining of plastic surrounding said metal ring so as to be interposed between the opposite outer walls thereof and said two parts respectively, said lining being retained in position by means of said rounded marginal portions of greater diameter, said rounded portions also being of sufficient thickness to give a direct self-centering contact between said two parts, while the linings are compressed between said rectilinear portions and said parts and a clamp embracing the lining at the opposite edge of the device.

EUGÈNE FREYSSINET.